Feb. 19, 1935.    H. J. H. HUBER    1,992,031
INSULATING LIQUID SEAL
Filed Dec. 22, 1932
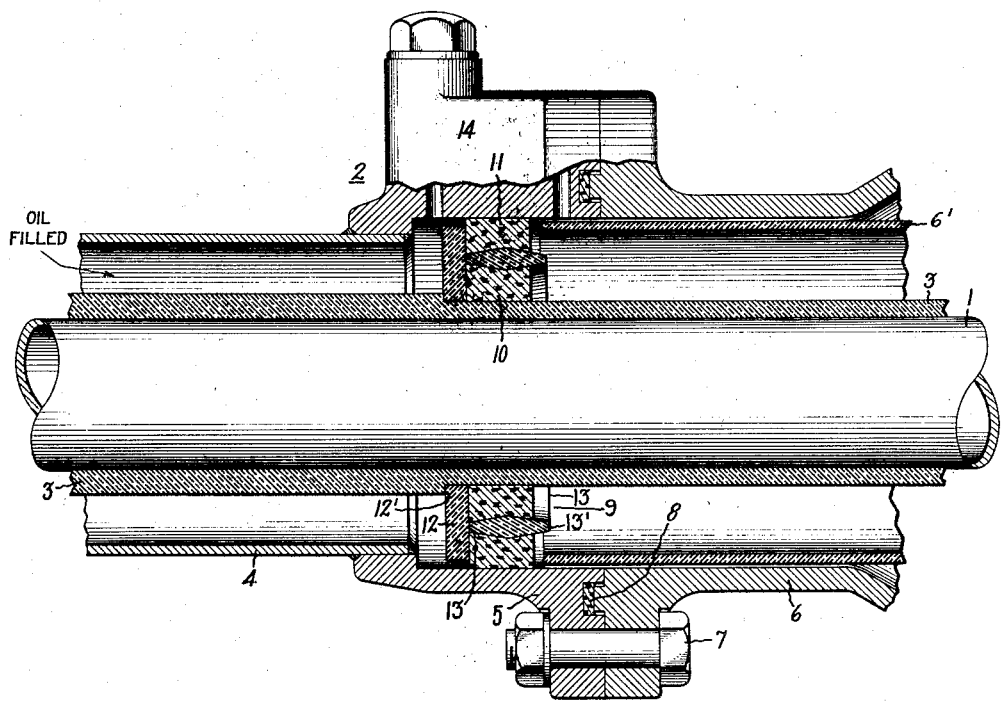
Inventor:
Herman J. H. Huber,
by Charles E. Tullar
His Attorney.

Patented Feb. 19, 1935

1,992,031

UNITED STATES PATENT OFFICE 1,992,031

INSULATING LIQUID SEAL

Herman J. H. Huber, Brookline, Pa., assignor to General Electric Company, a corporation of New York Application December 22, 1932, Serial No. 648,452

4 Claims. (Cl. 247—1)

My invention relates to insulating liquid seals, more particularly to seals or stoppers for confining insulating liquid as oil to individual units or sections of metal clad switchgear of the oil-filled type.

In metal clad apparatus, as switchgear of the aforesaid type, comprising individual factory built units arranged to form a complete switching station, the enclosing metallic casings or housings for the electrical conductors, busbars and associated apparatus of each unit are generally filled with oil prior to shipment from the factory so that the assembly in the field is reduced to a minimum. In view of the fact that similar units are interconnected to form the switching station, the individual units must be provided with oil seals or stoppers for preventing loss of oil during shipment and prior to connection of the units. Likewise in operation the insulating oil for a particular unit or section is preferably segregated from that of adjacent units so that loss or drainage of oil from one section does not affect other parts of the station.

The principal object of my invention is the provision of an improved insulating liquid seal or stopper for metal clad gear of the aforesaid type.

Referring to the drawing, the single figure thereof is a fragmentary view, partly in section, of a metal enclosed busbar or conductor provided with an oil stopper embodying my invention.

The metal inclosed conductor illustrated by way of example comprises a tubular conductor or busbar 1 composed of copper or other suitable conducting material disposed substantially centrally of the enclosing metallic casing generally indicated at 2. The casing 2 contains an insulating liquid, as oil, and the busbar 1 is provided with an insulating coating 3 for the purpose of preventing voltage breakdown between the busbar and the enclosing casing which is generally grounded. In the interest of clearness, the insulating oil is not shown in the drawing, it of course being understood that it fills the annular space between the busbar and casing.

The enclosing metallic casing comprises a metallic pipe 4, a securing flange 5 which is secured thereto, and a coupling housing or sleeve 6 which is bolted as at 7 to the securing flange 5 and has positioned therein an insulating cylinder 6'. A liquid seal between the aforesaid flanges is provided by means of the resilient gasket 8 which is composed of cork or other suitable material.

For the purpose of sealing the oil within the pipe 4 at the end illustrated, sectionalizing the oil within the metallic casing and for providing an insulating mounting and positioning means for the busbar 1 there is provided a seal or stopper, generally indicated at 9, forming an insulating seal about the busbar. The insulating seal 9 comprises a pair of cylinders or rings 10 and 11 composed of a resilient insulating material, as cork for example, concentrically disposed about the busbar 1 and interposed between the same and the enclosing casing 2. An insulating collar 12 bearing against a shoulder 12' formed by a reduced section of the busbar insulating coating 3 serves as a backing member for the cork rings 10 and 11 so as to prevent movement of said rings longitudinally of the busbar 1 in that direction.

For the purpose of forcing the cork rings into firm sealing engagement with the insulating coating 3 of the busbar and the inner wall of the securing flange 5, a wedging member 13 composed of a suitable insulating material is driven between the cork rings. The wedging member 13 is annular in form as illustrated and the wedging surfaces thereof diverge from the opposite edges 13' towards the center. A simple construction thereof comprises a short length of an insulation cylinder beveled at the opposite ends. By means of this construction the cork rings 10 and 11 when driven against the backing collar 12 and into sealing engagement with the busbar and enclosing casing close about the wedging member, by reason of the resilient character of cork, so that the wedging ring is substantially locked in position. There is, therefore, little danger of the wedge 13 working out from between the cork rings thereby losing the seal. The width of the cork rings and the shape of the annular wedge is preferably related as illustrated so that the widest portion of the annular wedge is near the mid portion of the cork rings. This arrangement is effective to exert sufficient radial pressure on the cork rings and to firmly lock the insulating wedge in position. Likewise the busbar itself is firmly positioned centrally of the casing 2 by the insulating seal 9.

Under certain conditions it may be desirable to transfer insulating liquid or oil from one sectionalized portion of the metallic casing to another. One way of accomplishing this comprises a valve controlled by-pass around the oil stopper 9 so that the oil from one section may be transmitted to another section. Such an arrangement is generally indicated by the valve housing 14 which forms a part of the securing flange 5 and is specifically disclosed and claimed in copending application Serial No. 648,451 filed concurrently herewith by A. S. Carlson for Metal clad switchgear.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. In electrical apparatus including an electrical conductor for high tension power circuits, a metallic casing enclosing said conductor and an insulating liquid contained within said casing, liquid sealing means comprising a pair of individual cork rings interposed between and concentrically disposed with respect to said conductor and casing, and a wedging member of insulating material disposed between said rings forcing the same radially into firm sealing engagement with respect to said conductor and casing.

2. In electrical apparatus of the metal clad oil-filled type including a conductor, a metallic casing within which said conductor is centrally disposed, and an insulating liquid contained within said casing, means for sectionalizing the insulating liquid within said casing and positioning said conductor therein comprising a ring of resilient insulating material interposed between and concentrically disposed with respect to said conductor and casing, an annular wedge of insulating material disposed concentrically of said conductor and coacting with said ring, and an insulating collar mounted on said conductor serving as a backing member for said ring and wedge.

3. In electrical apparatus of the metal clad oil-filled type including an electrical conductor, a metallic casing within which said conductor is concentrically disposed, and an insulating liquid contained within said casing, a liquid stopper and insulating mounting for said conductor comprising a pair of rings of resilient insulating material concentrically disposed about said conductor, an insulating collar mounted on said conductor serving to prevent movement of said rings longitudinally of said conductor in one direction, and an annular wedge of insulating material driven between said ring forcing them against said collar and radially into firm sealing engagement with said conductor and casing respectively.

4. In electrical apparatus of the metal clad oil-filled type including an electrical conductor, a metallic casing within which said conductor is substantially concentrically disposed, an insulating coating for said conductor, and an insulating oil contained within said casing, an oil stopper and insulating mounting for said conductor comprising an insulating collar mounted on said conductor and bearing against a shoulder formed by said insulating coating, a pair of cork rings concentrically disposed about said conductor, and a wedging member interposed between said rings forcing the same against said collar and into firm sealing engagement with the insulating coating on said conductor and said casing respectively.

HERMAN J. H. HUBER.